Aug. 11, 1931.  A. C. HOEH  1,818,622
DRIVER FOR REAMERS AND THE LIKE
Filed Jan. 6, 1930

INVENTOR
Albert C. Hoeh
BY
ATTORNEYS

Patented Aug. 11, 1931

1,818,622

UNITED STATES PATENT OFFICE

ALBERT C. HOEH, OF ROYAL OAK, MICHIGAN

DRIVER FOR REAMERS AND THE LIKE

Application filed January 6, 1930. Serial No. 418,688.

The present invention pertains to a novel tool driver adapted for the operation of reamers, grinders, lapping tools, drills and various other similar devices, the primary object being to devise a driver permitting both angular and lateral displacement for obtaining a perfect lining up of the tool with the work.

Another object of the present invention is to devise a tool driver having a standard shank adapted to be inserted into a standard machine spindle and having an adapter at its opposite end conforming to the size of the tool which the customer wishes to employ, a novel driving means being provided between said spindle and said adapter which permits the adapter to move angularly or laterally in relation to the shank. The angular movement permits the tool mounted upon the adapter to follow the centre line of a bore in the work even though the centre line of the bore may be at an angle in relation to the centre line of the machine spindle or of the shank. The lateral movement permits the tool to follow a straight line, along the centre line of the bore in the work, even though the centre line of the shank in the machine spindle is not directly in line with the centre line of the bore in the work.

Another object of the present invention is to devise a tool driver which is specially adapted for use in multiple spindle drill machines or grinders, the driver permitting automatic or self adjustment of the tool in the work. The present driver when equipped upon machines for reaming or lapping automobile cylinders will permit lateral displacement which permits the reaming or the lapping to be accurately performed because a perfect drive may be obtained without the necessity of having perfect alignment between the machine spindles and the center line of the cylinder bores.

With the above and other ends in view the invention consists in the matters hereinafter set forth and more particularly pointed out in the appended claims, reference being had to the accompanying drawings, in which Figure 1 is a longitudinal cross sectional view through the present driver;

Like characters are employed throughout to designate the corresponding parts.

Figure 1:
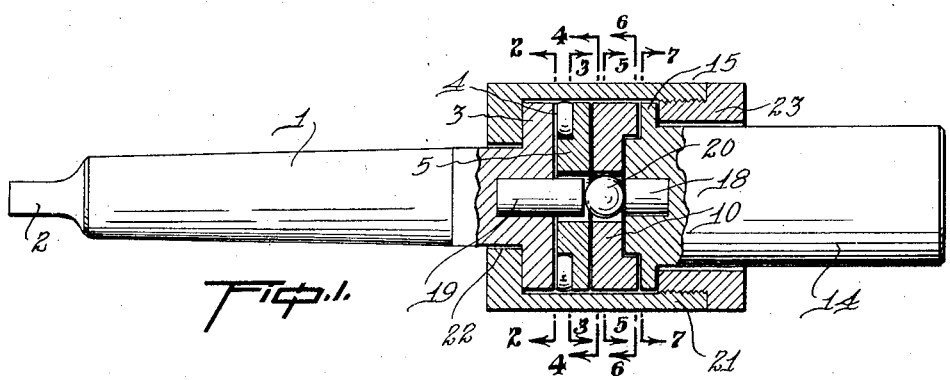
Figure 2:
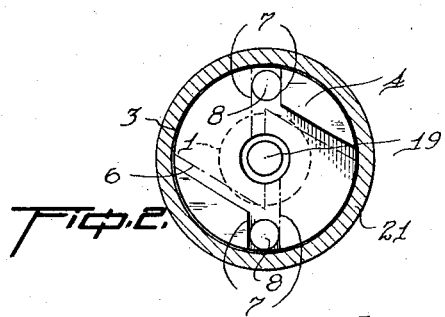
Fig. 2 is a transverse cross section on the line 2—2 of Figure 1.

The numeral 1 indicates a shank having a tang 2 formed on the end thereof, both shank and tang being of a size which conforms to the standard size of machine spindles whereby it may be inserted and secured therein in the usual or conventional manner. The opposite end of the shank terminates in an enlarged circular head 3 having driving lugs 4 formed on the outer face thereof to project outwardly therefrom, the shape of the lugs being clearly illustrated in Fig. 2 of the drawings.

Figure 3:
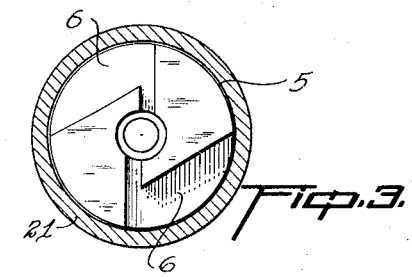
Fig. 3 is a transverse cross section on the line 3—3 of Fig. 1.
Figure 4:
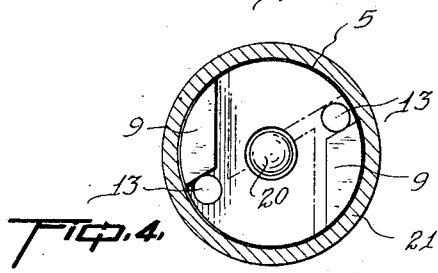
Fig. 4 is a transverse cross section on the line 4—4 of Fig. 1.
Figure 5:
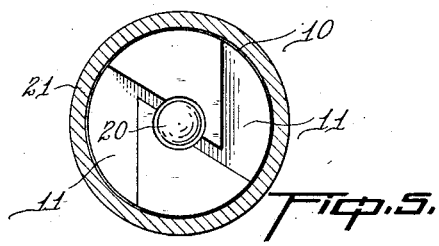
Fig. 5 is a transverse cross section on the line 5—5 of Fig. 1.
Figure 6:
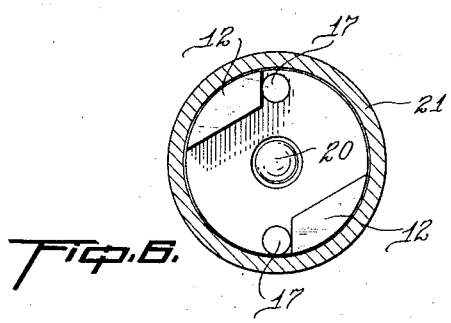
Fig. 6 is a transverse cross section on the line 6—6, of Fig. 1.
Figure 7:
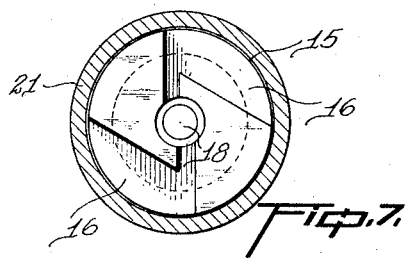
Fig. 7 is a transverse cross section on the line 7—7 of Fig. 1.

A circular disk 5 is provided with a pair of recesses 6 corresponding in depth to the height of the lugs 4, the shape of the recesses being illustrated in Fig. 3 which makes it apparent that the disk 5 may be placed against the head 3 so that the lugs 4 are received in the recesses 4. When the lugs 4 are in the recesses 6 there remains a space indicated by the numeral 7 in Fig. 2, the relation of the side walls of the recess with the side walls of the lugs being illustrated by showing the recess in broken lines. Circular disk bearings 8 of a diameter corresponding accurately with the size of the spaces 7 are inserted between the walls of the lugs 4 and the walls of the recesses 6 and therefore it becomes apparent that the lugs and recesses with the bearings 8 provide a driving connection between the head 3 and the disk 5.

For a purpose which will become apparent as the description progresses it is found desirable, and under some circumstances necessary, to form the bearings 8 with their outer edges rounded. This prevents a binding or shearing action between the disk and the head, the latter being avoided by forming the bearings 8 from ball bearings which have two flat parallel faces ground thereon.

The opposite face of the disk 5 to the one that is above described is provided with lugs 9 identical in shape to the lugs 4, located in a different position radially. A second disk 10 having recesses 11 to receive the lugs 9 is provided, the rear face of the disk also having lugs 12 formed thereon, the walls of the lugs and recesses being spaced in the same manner as described above in order to accommodate circular disk bearings 13.

The adapter 14 is provided with an enlarged head 15 which has recesses 16 to receive the lugs 12 and the circular disk bearings 17 in the same manner as described above. The head 15 is also provided with a centrally located bore to accommodate a hardened metal slug 18 and the head 3 on the shank 1 is provided with a similar bore to accommodate a similar slug 19, an end thrust bearing 20 being received between the two slugs.

A cup member 21 is provided with a bore 22 in its end wall to surround the shank 1, the cup portion being adapted to surround the heads 3 and 15 and the disks 5 and 10. A nut 23 is screwed into the end of the cup member and butts against the head of the adapter to draw the head on the shank and in this manner the slugs 18 and 19 are into engagement with the thrust bearing 20.

From the above description it becomes apparent that any pressure longitudinally exerted on the shank is transmitted to the adapter through the slugs 18 and 19 and the end thrust bearing 20. This permits spacing of the disks 5 and 10 which are not subjected to longitudinal pressure and therefore the disks are permitted to move laterally relative to the heads 3 and 16, lateral movement being accommodated by forming the cup member 21 of sufficient internal diameter so that there is a clearance radially.

The lateral displacement of the disks permits the adapter 14 to be rotated around a centre axis which is off-set from the centre axis of the shank 1 and at the same time permit end pressure to be transmitted from the shank to the adapter. The disks also permit the adapter to be rotated around a centre axis which is inclined angularly in relation to the centre axis of the shank and at the same time exert end pressure upon the adapter by means of the slugs and the end thrust bearing.

The inclination of the adapter relative to the shank is accommodated by spacing the disks 5 and 10 from the heads 3 and 15 and from each other and by the lugs and recesses which accommodate the disk bearings 8, 13 and 17 through which rotative pressure is transmitted. The circular disk bearings, by reason of the fact that they are formed from spherical balls as above described, permit the disks to tilt without causing a shearing or binding action.

Although a specific embodiment of the present invention has been illustrated and described it is to be understood that various changes may be made within the scope of the appended claims without departing from the spirit of the invention and such changes are contemplated.

What I claim is:

1. A driver comprising a shank having an enlarged head formed thereon, an adapter having an enlarged head formed thereon, an end thrust bearing between said adapter and said shank, loosely mounted disks between said heads, and a cup member provided with a nut adapted to draw said heads against said end thrust bearing, said heads and disks being provided with coinciding inter-engaging lugs and recesses providing a rotary driving connection between said shank and adapter whereby the latter may be laterally displaced or angularly inclined relative to said shank.

2. A driver comprising a shank and adapter having an end thrust bearing interposed therebetween, means for maintaining said shank and adapter in end to end relation, and a plurality of loosely mounted disks surrounding said end thrust bearing, the ends of said shank and adapter and said disks being provided with coinciding inter-engaging lugs and recesses providing a rotary driving connection between said shank and said adapter whereby the latter may be laterally displaced or angularly inclined relative to said shank.

3. A driver comprising a shank having an enlarged head formed thereon, an adapter having an enlarged head formed thereon, an end thrust bearing between said adapter and said shank, loosely mounted disks between said heads, and a cup member provided with a nut adapted to draw said heads against said end thrust bearing, said heads and disks being provided with coinciding inter-engaging lugs and recesses providing a rotary driving connection between said shank and adapter whereby the latter may be laterally displaced or angularly inclined relative to said shank, said inter-engaging lugs and recesses having their walls spaced relative to each other to receive circular disk bearings.

4. A driver comprising a shank and adapter having an end thrust bearing interposed therebetween, means for maintaining said shank and adapter in end to end relation, and a plurality of loosely mounted disks surrounding said end thrust bearing, the ends of said shank and adapter and said disks being provided with coinciding inter-engaging lugs and recesses providing a rotary driving connection between said shank and said adapter whereby the latter may be laterally displaced or angularly inclined relative to said shank, said inter-engaging lugs and recesses having their walls spaced relative to each other to receive circular disk bearings.

5. A driver comprising a shank and adapter held in spaced relation by means of an end-thrust bearing, a plurality of disks loosely mounted between said shank and said adapter and surrounding said end-thrust bearing, said shank and adapter and said disks being provided with coinciding inter-engaging lugs and recesses making a driving connection between said shank and adapter whereby the latter may be laterally displaced and angularly inclined relative to said shank.

6. A driver comprising a shank and adapter held in spaced relation by means of an end-thrust bearing, a plurality of disks loosely mounted between said shank and said adapter and surrounding said end-thrust bearing, said shank and adapter and said disks being provided with coinciding inter-engaging lugs and recesses making a driving connection between said shank and adapter whereby the latter may be laterally displaced and angularly inclined relative to said shank, said inter-engaging lugs and recesses having spaced walls, and rounded circular disk bearings interposed between the spaced walls.

In witness whereof I affix my signature.

ALBERT C. HOEH.